June 26, 1956

W. E. QUINTON 2,752,566

METHODS AND MEANS FOR INDICATING CONTAMINATION
OF LUBRICATING OIL

Filed Jan. 5, 1952

INVENTOR.
WAYNE E. QUINTON

BY
Reynolds, Beach & Christensen
ATTORNEYS

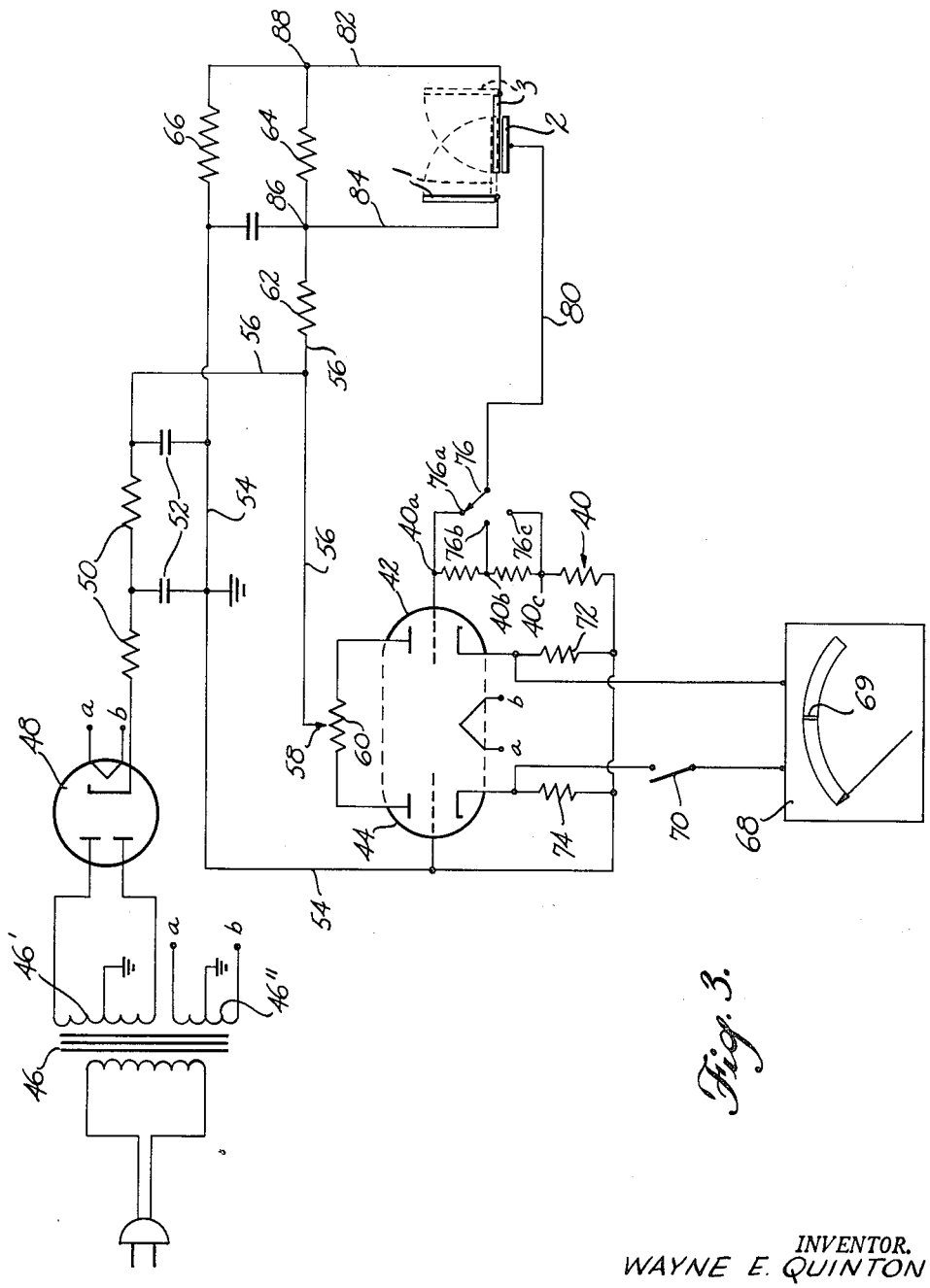

United States Patent Office
2,752,566
Patented June 26, 1956

2,752,566
METHODS AND MEANS FOR INDICATING CONTAMINATION OF LUBRICATING OIL

Wayne E. Quinton, Seattle, Wash., assignor, by direct and mesne assignments, of one-third to Richard W. Wells and one-third to Ole Bardahl, Seattle, Wash.

Application January 5, 1952, Serial No. 265,154

9 Claims. (Cl. 324—65)

This invention provides a method and a means whereby a person having no technical skill nor scientific knowledge relating to oil, such as a filling station attendant, may determine quickly, conveniently, and with a reasonable degree of accuracy, whether the oil in the crankcase of an automobile engine contains contaminants that render it unfit for further use, or is still usable, and can demonstrate to the driver, who is usually even less skilled in this art, the oil's condition. Thereby the necessity for draining and replacement of the crankcase oil can be determined on the basis of a positive and dependable indication, rather than by rule of thumb such as mileage run, or an impositive test such as its appearance or feel. The method and means of this invention will afford a test for chemical contaminants, or for solid contaminants, or both. While there are other factors that bear on the usability of the oil, these two factors usually assume the greatest importance, and have been incapable of measurement heretofore with anything approaching exactness except by laboratory tests performed by skilled operators.

There have been available laboratory methods of testing lubricating oil to ascertain its condition and usability, but such laboratory methods are usually available only to large fleet owners who can afford to maintain their own servicing facilities, or to hire the testing services of a laboratory. The vast majority of individual drivers, and even the majority of fleet owners and operators, have not the facilities to make such determinations, nor can they afford to take the time and trouble to have such tests made on a regular routine basis necessary for engine protection.

It is the primary object of this invention to provide a method readily and quickly usable by, and mechanism for use by, such persons as have been indicated, whereby they may ascertain and demonstrate the presence in or absence from the lubricating oil in the crankcase of any given car, of solid and/or chemical contaminants in quantities such as to render the oil unfit for further use. Naturally, the primary object above can only be attained if the mechanism be simple in operation, reasonably rugged, not unduly expensive nor bulky, and reliable in its indication of each type of contamination, and if it afford an immediate indication which anyone may understand, such as a gauge finger movable relative to a "safe" limit indication. The provision of such mechanism is a further object of this invention.

In detail, it is an object of this invention to provide a meter or indicator, preferably electrically actuated, arranged in circuit with a pair of terminals or electrodes in such manner that a representative sample of oil from the dipstick of an engine, when placed to cover one such electrode, and contacted from above by the complemental electrode, will affect a characteristic of the current flowing between the electrodes through the interposed oil sample, differently according to the degree of contamination (chemical or solid, as the case may be), and the resultant effect will be reflected in at least a "safe or unsafe" indication at the meter or equivalent indicator.

Still further, it is an object to provide a single such mechanism capable of indicating, on the one hand, the degree of chemical contamination present in the oil sample, and on the other hand, alternatively, the degree of solid contamination present, and one which requires no conscious switching or selection by the attendant in order to determine successively the presence of each type of contaminant.

The accompanying drawings show a representative form of the mechanism, and diagrammatically an electrical circuit suited to the attainment of the stated objects, but it will be understood that these are illustrative rather than restrictive, and that the invention may be embodied in, and the method performed by, mechanism differing from that shown, though still within the principles of this invention, as herein described and claimed.

Figure 3 is a schematic electrical diagram of the apparatus in its presently preferred form and arrangement.

Figure 1:
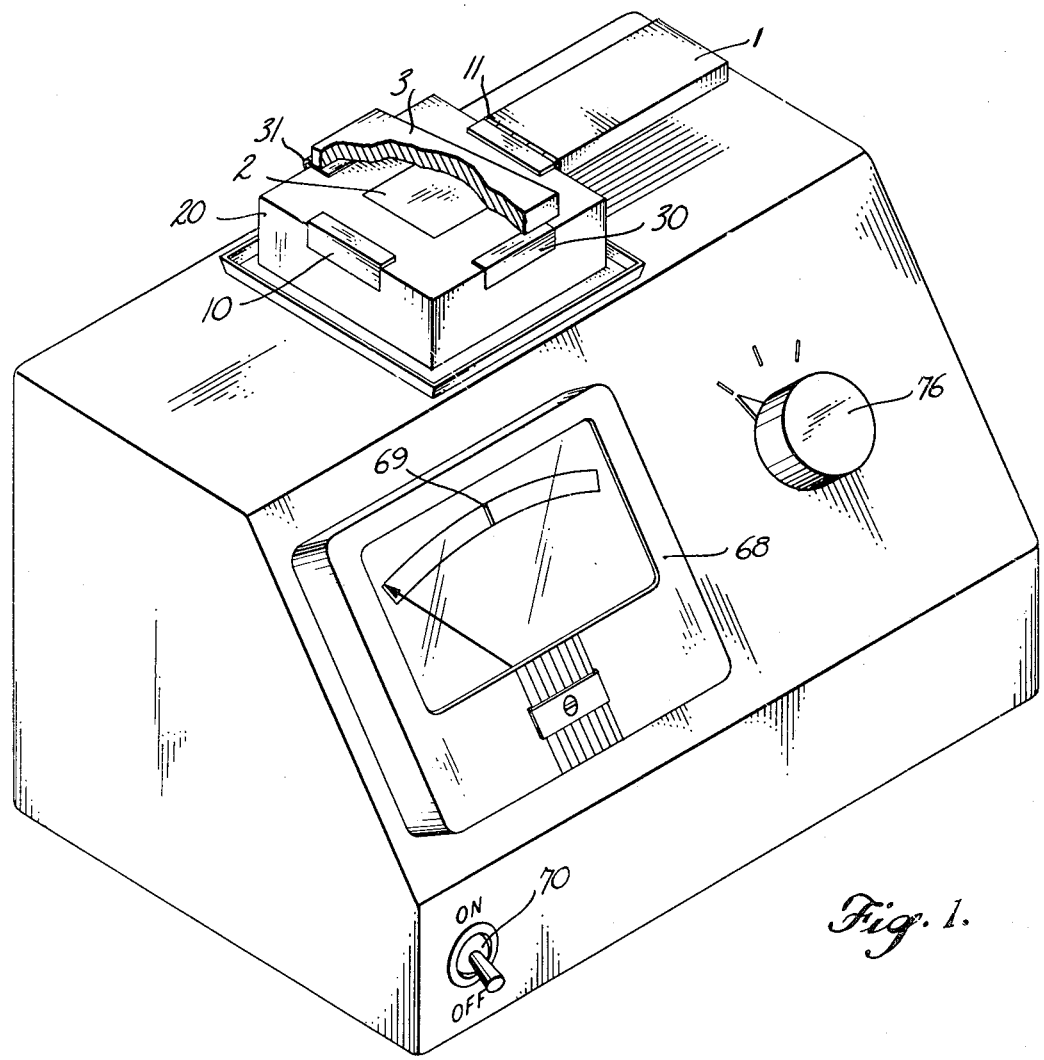
Figure 1 is an isometric view with parts broken away illustrating a typical form of the complete mechanism.
Figure 2:
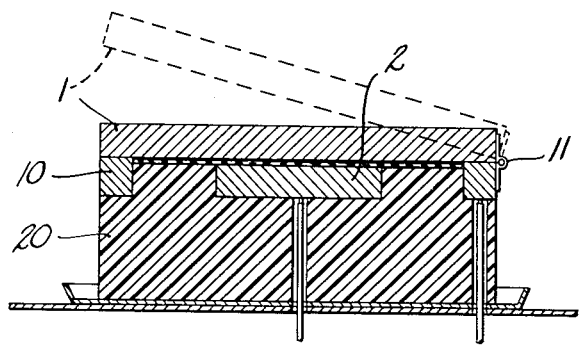
Figure 2 is a vertical, sectional view through two of the cooperating terminals.

Lubricating oils, especially such as are intended for use in internal combustion engines, have been greatly improved by the addition of detergents, anti-oxidants, acid-inhibitors, etc., and as so improved presently have a materially longer useful life than they had prior to the employment of such additives. Nevertheless, it is still common practice to change the oil in the crank case of an automobile engine, for example, after the automobile has run, say, one thousand miles. The practice in this respect has not changed materially in many years, notwithstanding recently advanced claims on behalf of certain oils that they need be changed only twice a year, or once in several thousand miles of driving. The one-thousand-mile yardstick is largely a rule of thumb, and bears no close relation to the period of usefulness of present-day lubricating oil. Under some driving conditions, or with some motors, the oil will become contaminated by solid contaminants, such as the products of carbonization or of resin formation, or such as dust particles, or, more rarely, metal particles abraded from the moving parts of the motor, before the automobile has run as much as one thousand miles following an oil change. Sometimes simultaneously, or independently in other cases and under other conditions, other chemical reactions will have taken place, such as oxidation of the oil, and the formation of acids, before the end of one thousand miles of driving. It is far oftener the case that solid contaminants will not be present in injurious quantities until long after the expiration of one thousand miles of driving. Liquid contaminants, hereinafter referred to as chemical contaminants, are much more likely to be present in harmful quantities before there are present enough solid contaminants to be harmful. However, it is usually the case that the presence of anti-oxidants, corrosion inhibitors, and other chemical additives will inhibit the presence of even chemical contaminants, or the chemical reactions that lead to the formation of solid contaminants, for a long period of time, and the lubricating qualities of the oil will not be sufficiently impaired to require a change of the oil until long after the conclusion of one thousand miles of driving.

However, there has been available heretofore no readily usable means or method for testing oil samples, for both types of contamination, with reasonable accuracy, especially for conducting relatively rapid "on the spot" tests, as when engine oil level is being checked in a filling station, for example, and so the practice is still almost universally prevalent of changing the oil in such an engine on a basis measured solely in miles of driving, or in the case of airplane engines and the like, in flying hours. In this way not only is there a very large economic waste of oil still usable for extended periods without the risk of injury to the motor, but there is also a corresponding unnecessary depletion of a dwindling natural resource.

The basis of the method of this invention lies in the discovery that the electrical resistance of a sample of any given uncontaminated engine lubricating oil, across a given gap distance between two electrodes of standardized area, is a stable or reasonably constant quantity, and although this quantity will vary as between different oils, in accordance with their inherent characteristics, or the kind and quantity of additives present in the oil, the measurement of resistance in such a case can be taken, for each oil, as a reference base. It has been discovered, further, that contamination, either from chemical change or from the presence of solids, causes a change in the resistance across the gap, and that the change in resistance is a function of the degree of each kind of contamination. It can be determined at what point either type of contamination renders the oil unsafe or unfit for further use, and that "safe-unsafe" point can be indicated suitably, wherefore, whenever the contamination—chemical or solid, or both—has proceeded to the indicated "unsafe" point, the oil is removed. If the excessive contamination is merely from solids, these may be removed as by filtering, and the oil can again be used. If the excessive contamination is from chemicals, unless it proves feasible to neutralize or remove them, the oil should be discarded.

In accordance with the method contemplated by this invention, a sample of oil to be tested for the two types of contamination is subjected to electric potential and its electrical resistance indicated under two different sets of test conditions, one set of conditions being peculiarly applicable to the determination of chemical contamination, and the other to that of solid contamination of the oil. More specifically the oil sample is placed between opposed electrode surfaces of standardized area which are mutually separated by a predetermined gap distance, which distance in the case of the chemical contaminant phase of the dual test is well in excess of maximum expected or known working clearances between mutually opposed lubricated surfaces of the engine, while in the solid contaminant phase of the test such distance is made approximately equal to, or slightly less than, the normal or average working clearances between opposed lubricated surfaces of the engine. The significance of this selection of electrode gap distances for the respective test phases may be appreciated by referring to the following observations. The first is that particle size of the solid contaminants in the oil is largely controlled by normal working clearances in the engine because of the fact that most of the particles circulating with the oil will necessarily be reduced to that size in the course of time if they are to pass through the normal clearance spaces, although some of the particles may still be larger. Secondly, it may be demonstrated that the electrical conductivity of the oil sample, if measured directly through the solid contaminants is great relative to the electrical conductivity when measured through chemically contaminated oil under conditions wherein the effect of solid particle conductivity is overcome either by taking it into account when interpreting the results of a measurement or by removing the solid particles from the sample. Finally, it is possible to correlate the electrical conductivity or resistivity of the oil, as revealed in these two separate test phases, with that degree of contamination from solid contaminants and from chemical contaminants, respectively, which has been found to be injurious.

Thus when the shorter of the two gap distances is presented, measurable electrical resistance of the oil sample is essentially that which arises solely from electric current flowing through solid particles as a result of direct physical contact of the opposed electrode faces with solid contaminant particles, and the effect of conductivity through surrounding chemically contaminated oil under these conditions is negligible by comparison. On the other hand, when the longer of the two electrode gap distances is presented, electrical resistance of the oil sample becomes high and is a measure of the chemical contamination, the solid contaminant particles being too small to bridge between the electrode faces, although the effect of their presence in the body of oil between the electrodes may be taken into consideration when interpreting the test result because they tend effectively to shorten the electrode gap distance in proportion to the volume in which they are present. If there is present such volume of solids as to affect materially the long-gap indication, that fact will be indicated in quantitative terms by the short-gap resistance measurement previously mentioned, and so regardless of the degree of chemical contamination the oil should be discarded because of the presence of excessive quantities of solid contaminants.

Convenience is served in practicing the method by conducting both resistance measurements with a single sample of oil dropped from a crankcase dipstick upon one electrode face. Care must be taken that the oil is representative of that in the crankcase, to which end the sample should be taken before appreciable settling has occurred. Next an opposing electrode is positioned above the first at a spacing equal to the larger of the two gap distances desired (normally about 0.020 of an inch) for executing the chemical contaminant test phase, the small pool of oil on the first electrode being flattened out into a thin film of uniform thickness spread out over the entire area of the electrodes when the movable electrode is moved into this test position. The excess oil simply spreads out past the electrode edges and does not influence this first resistance measurement. Next the gap distance is reduced (normally to about 0.002 of an inch—with the same or a different pair of electrodes and oil sample), and more oil of the sample is squeezed out from between the electrodes so that direct contact of the electrode faces with the solid contaminant particles obtains, as mentioned above. Thus by conducting the chemical contaminant test phase first, instead of second, ample oil from the sample remains on the base electrode for the second or solid contaminant test phase, whereas a reverse order of procedure would require another sample of oil to be added. It can well be appreciated, however, that the two phases of the test may be conducted with the same or separate sets of electrodes and separate oil samples extracted from the crank case, as the method embraces various possible detailed procedures in its broader aspects.

Additional features of this invention reside in the preferred apparatus for implementing the test method. In broad terms the apparatus comprises electrode means of standardized area and gap distance between which an oil sample is placed, and resistance-determining circuit means operatively connected thereto including a source of electric potential, preferably a constant direct potential although it could be alternating applied to such electrode means, and indicator means sensitive to resultant electric current flowing in the circuit through the oil sample. More specifically, in the preferred form a single horizontal base electrode is provided for initial deposit of the oil sample thereon, and two separate upper electrodes are alternately movable into cooperative relation thereto, each being preferably pivotally supported adjacent different sides of the base electrode to be swung alternatively into limiting position thereover, with the desired clearance distances being established by fixed stops separately engageable by the respective swingable upper electrodes. One such upper electrode thereby functions for measurement of chemical contamination and the other for solid contamination.

The potential source includes relatively high and low voltage tap points therein, the first being connected to the chemical contaminant measuring upper electrode and the second to the solid contaminant measuring upper electrode, such that the order of magnitude of current flowing in each instance is the same, whereby a single indicating device, such as a galvanometer, will suffice for both test measurements. Moreover, the two swingable upper electrodes serve as their own electrical switches when operatively positioned, closing their branch of the circuit for current flow therein.

The three electrodes are indicated in Figure 1, that which may be called the first movable electrode being indicated at 1, the common or fixed base electrode being indicated at 2, and the second movable electrode at 3. Preferably the electrode 2 comprises a square plate conductor embedded in an insulating block 20 with its upper face flush with the top surface of the block. The movable electrode 1 comprises a rectangular plate conductor which preferably is pivotally mounted by hinge 11 to one edge of the block, while the second movable electrode 3 comprises a similar plate pivotally mounted by hinge 31 to an adjoining edge of the block. Such hinges guide the respective movable electrodes to be swung into substantially identical positions overlying the base electrode 2, except for their 90° relationship, so that for convenience, the two pairs of electrodes have in common an effective face area, which, if electrodes 1 and 3 have a width equal to or greater than electrode 2 and are centered thereto when swung into operative position, equals the area of electrode 2. Spacing of electrode 1 above base electrode 2 is established by a stop 10 projecting above the upper face of block 20 to contact the swinging end of such electrode, and in order to secure a parallel relationship of the electrodes 1 and 2 the hinge 11 is set an equal distance above the top of block 20. This spacing or gap distance between electrodes 1 and 2 is preferably about 0.020 of an inch, which well exceeds the normal working clearances in the engine lubricated by the oil being tested. These clearances are more or less uniform in present day design, and the spacing between the terminals 1 and 2 can be arranged to exceed by an appreciable margin the greatest of such clearances, for it is the purpose to space apart the terminals 1 and 2 at all times so far that an oil sample interposed between them will close a current path, but only through the oil itself and such chemical contaminants as it may contain. In other words, the two terminals are spaced so far apart that if there are discrete particles or solid contaminants suspended within the oil, these, being almost necessarily smaller than the working clearance, cannot possibly fully bridge the gap and form a direct conductive path between these two electrodes and conduction of current must necessarily occur primarily through liquid alone. However, this spacing should not be made greatly in excess of the normal working clearance of lubricated engine parts for the reason that the greater the length of the current path through the oil the higher the electrical resistance, and the more difficult it becomes to measure resistance reliably.

Similarly, the spacing of electrode 3 from base electrode 2 is established by its hinge 31 and the cooperative stop or spacer element 30 projecting equally above the top of the block 20, hence above the terminal 2, by a distance preferably of about 0.002 of an inch, which distance approximates the normal working clearance in the usual automobile engine from which the oil may be tested. In this case, if there are any solid contaminant particles suspended in the oil, large enough in size to be injurious to the engine, these particles will become pressed into contact with both electrodes 2 and 3 and form a conductive path through the oil sample. These particles, because of their high conductivity relative to chemically contaminated oil, will thereby afford a path of so much less resistance than the path through the oil itself and its chemical contaminants, that the conductivity of the oil and chemical contaminants under these conditions will be negligible, and any measure of resistance of the sample between electrodes 2 and 3 will be a direct indication of the amount of injurious solid contaminants present. It will be understood that it is not essential that the spacing between the electrodes 3 and 2 be precisely the amount of normal working clearance, and indeed that clearance nominally and actually varies in different engines, but the clearance between these two electrodes 3 and 2 must be sufficiently small (whether somewhat under the normal working clearance or somewhat greater than the same) to insure the closure of the gap for purposes of electrical conduction primarily through the solid particles suspended in the oil sample.

Because of the veritable enormous difference between the resistance of a typical oil sample having both types of contamination when tested between electrodes 1 and 2 on the one hand, and electrodes 3 and 2 on the other, the design of a practicable electrical circuit for measuring or indicating these resistance values in order to determine whether the oil sampled is still usable requires special attention, especially if the economy which may be effected by use of a single inexpensive indicating device for both measurements is to be realized. For example, with an electrode 2 of approximately two square inches area and with electrodes 1 and 3 of a width equal thereto, an oil sample extracted from a typical engine at the stage in which the oil was sufficiently contaminated both chemically and by suspended solids to require changing, the resistance of the sample as measured between electrodes 1 and 2 was approximately $5 \times 10^5$ ohms while that between the electrodes 3 and 2 was approximately $6 \times 10^9$ ohms, or a difference factor or ratio of about 10,000.

The electrical circuit herein disclosed is nevertheless capable of providing on a single conventional meter or other indicating device, reliable indications of the condition of the oil, by resistance measurement, for both inter-related tests, namely solid and chemical contamination.

In order to accomplish this result the voltage drop through a resistor 40 common to both pairs of electrodes (1, 2 and 3, 2) is applied to one side of a normally balanced vacuum tube amplifier bridge circuit including the similar triode amplifiers 42 and 44, and this voltage drop in the case of current flow between electrodes 1, 2 is caused to be of the same order of magnitude as that resulting from flow between electrodes 3, 2 by application of a much higher potential to electrodes 3, 2 than that applied to electrodes 1, 2.

Supply voltage for the vacuum tube amplifier bridge circuit and for producing current flow through the oil test samples is provided by the conventional power supply circuit comprising transformer 46, full-wave rectifier 48, and a filter network comprising resistors 50 and condensers 52 as shown. The main secondary winding 46' of this transformer is connected to the two anodes of rectifier tube 48 while the filament winding 46" thereof has terminals a and b connected by conductors (not shown) to correspondingly labeled filament terminals of vacuum tubes 42, 44 and 48. A filtered direct voltage therefore appears between ground conductor 54 and voltage distribution conductor 56. One branch of conductor 56 is connected to the adjustable tap 58 of the potentiometer or variable resistance winding 60 having opposite terminals connected respectively to the anodes of the amplifiers 42 and 44. Another branch of conductor 56 is connected to one end of the voltage-dividing network of resistors 62, 64 and 66, the other terminal of which network is grounded, as shown.

Current flowing through the two sides of the vacuum tube amplifier bridge circuit comprising the amplifier tubes 42 and 44, respectively, is initially balanced by adjustment of potentiometer tap 58 in order to produce a zero reading on galvanometer 68, which is connected between the cathode terminals of the amplifier tubes through on-off switch 70. As illustrated, the tubes 42 and 44 are connected as balanced cathode-follower amplifiers, the reading of meter 68 being proportional to the difference between voltage drops in cathode resistors 72 and 74, respectively.

The control grid of tube 44 is at reference or ground potential, being connected to conductor 54, while the grid of tube 42 is connected to the upper end of resistor 40 and receives a potential, with reference to ground, which is proportional to the magnitude of current flowing in such resistor. A selector switch 76 has selectively engageable contacts 76a, 76b and 76c connected to different tap points 40a, 40b and 40c on resistor 40, whereby current in conductor 80 may be caused to flow through all or a selected fraction of resistor 40. Conductor 80 is connected to electrode 2, while electrode 3 is connected through conductor 82 to tap point 88 (between resistors 64 and 66) and electrode 1 through conductor 84 to tap point 86 (between resistors 62 and 64) in the voltage dividing network comprising resistors 62, 64 and 66.

The respective potentials of tap points 88 and 86 are selected such that the flow of current which they respectively produce through the oil sample between electrode pairs 3, 2 and 1, 2, respectively, is of the same order of magnitude, so that the sensitivity of meter 68 will be correct for both test phases. In one practical circuit employing 350 volts between conductors 56 and 54, resistor 62 was 500,000 ohms, resistor 64 was 150,000 ohms, resistor 66 was 150,000 ohms, making the potential at point 88 about 10 volts and that of point 86 about 300 volts. In that same circuit the total resistance of resistor 40 was 20 megohms and for test purposes on a particular type of oil was connected directly to conductor 80 without a switch 76. The purpose of switch 76 for tapping different points along resistor 40 is to permit changing the value of this resistor to suit different types of oil being tested, some having a higher chemical conductivity—inherently, or arising from their respective additives—than others without any chemical contamination present. Thus the effective resistance value of resistor 40 from tap point 40c to ground in a typical case of that kind was 10 megohms, that of tap point 40b was 20 megohms and that of tap point 40a was 50 megohms.

However, use should be made of a variable resistor 40 with selector switch 76 only for the chemical contaminant phase of the test, as the inherent chemical conductivity of the particular oil (caused by detergent and anti-acid factors, etc.) without contamination does not affect the solid contaminant test phase for the reason that the flow of current through the solid contaminant particles between electrodes 3 and 2 is not appreciably affected by chemical conductivity of the oil. Hence with all types of oil the setting of switch 76 should be the same for the solid contaminant phase of the tests.

Thus it will be seen that the flexibility of the circuit enables it to be used for testing different types of oil for both forms of contamination and that a single indicating device will provide an indication of whether conductivity, hence contamination, in either test phase is above or below a certain predetermined amount representing the acceptable line of division (as indicated at 69) between usable and excessively contaminated oil. In effect the bridge circuit and meter 68 represent a sensitive vacuum tube voltmeter, but it will be appreciated that the type of apparatus used to provide the desired indication of conductivity of the oil sample is subject to choice from among different possible electrical circuits and indication devices. As to the type of indication presented, a meter type indicator has the advantage of revealing how "good" or how "bad" the oil may be, but it will be appreciated that a neon bulb or other "on-off" type indicating device could be used successfully in a suitable circuit to produce an indication only if oil sample resistance were above or below a selected value. These and other alternatives will be apparent to those skilled in the art, and all are intended to be embraced within the terms "meter" or "indicator."

I claim as my invention:

1. Mechanism for testing quantitatively and qualitatively the contaminants in a sample of lubricating oil, comprising a first, a second, and a third electrode, of which the second one is a common electrode, means mounting each of the first and third electrodes for movement towards and from the second electrode, means to space the first electrode from the common second electrode by more than the normal working clearance of the lubricated parts, and to space the third electrode from the common second electrode by an amount approximating that normal working clearance, electric meter means, and an electric circuit including said three electrodes and said meter means, to indicate by the meter means the variations in a current characteristic across the first and the common second electrodes through an oil sample interposed between them, and arising from variations in the degree of chemical contaminants present, and to indicate in the same way the variations in a current characteristic across the third and the common second electrodes, through such an oil sample, arising from variations in the degree of discrete contaminants.

2. A method for determining the extent of chemical contamination, and of contamination by suspended particles, in a test sample of lubricating oil, which comprises subjecting such sample momentarily to an electrical potential between two electrodes throughout a standard area and at a standard greater gap distance which materially exceeds the normal working clearance of the lubricated parts, to determine the instantaneous value of the chemical contamination, and likewise but separately subjecting the sample momentarily to an electrical potential between two electrodes throughout a standard area and at a standard lesser gap distance which approximates such normal working clearance to determine contamination by discrete particles, in each case comparing a characteristic of the current through the sample with the predetermined like characteristic of an uncontaminated sample under respectively identical conditions.

3. A method for the purposes, and performed as defined in claim 2, characterized in that the test sample is the same sample in each test, and the subjection of the test sample to the electrical potential is first performed at the greater gap distance, to determine chemical contamination, and in that the same sample is subsequently subjected to electrical potential at the lesser gap distance, to determine contamination by discrete particles.

4. A method for the purposes, and performed as defined in claim 2, wherein the electrical potential employed at the greater gap distance exceeds that employed at the lesser gap distance by a value of the order of 10000:1, and wherein the characteristic compared, in each instance, is the resistance through the test sample with the resistance through an uncontaminated sample.

5. Apparatus for testing lubricating oil for solid and chemical contamination thereof, comprising a first electrode pair of predetermined effective common area and having a relatively wide distance of separation therebetween when operatively positioned, a second electrode pair of substantially the same predetermined effective common area and having a relatively narrow distance of separation therebetween when operatively positioned, said electrode pairs being adapted for insertion of a lubricating oil test sample between the electrodes thereof, and electrical conductivity test circuit means including a source of electric potential including voltage divider means having a common reference potential point connected to one side of said electrode pairs, said voltage divider means further having high and relatively low voltage points connected to the opposite sides of said first and said second electrode pairs, respectively; electric current indicator means interposed in the circuit connection between said common reference potential point and said first side of the electrode pairs, and means operable to select the individual electrode pairs for testing conductivity of such an oil sample between each pair separately, as indicated by said electric current indicating means.

6. The apparatus defined in claim 5, wherein the electric current indicating means comprises a voltage-dropping resistor means interposed in the connection between the common reference potential point and the first side of the electrode pairs, electronic amplifier means arranged to amplify the voltage drop across such resistor, and an indicator energized by said amplifier means.

7. The apparatus defined in claim 6, wherein the voltage-dropping resistor means is selectively variable.

8. The apparatus defined in claim 5, wherein the two electrode pairs have an electrode in common, such common electrode being connected to the common reference potential point of the voltage divider means, and the remaining two electrodes are alternately movable into and out of operative position relative to said common electrode.

9. A method for determining relative solid and chemical contamination of lubricating oil, comprising first pressing a sample of such oil between opposing electrode surfaces of predetermined effective area to spread out the oil sample over such entire area into a film of a selected thickness in excess of the normal working clearance between mutually opposed lubricated surfaces of the engine whence the sample is taken, subjecting such oil sample film to an electric potential applied thereto by the electrode surfaces, in order to determine the electrical conductivity of such film by current flow therethrough, as an instantaneous measure of such chemical contaminants, only, as may be present in the sample, and subsequently pressing the same oil sample between electrodes of predetermined area into a thinner film approximating the normal working clearances, and subjecting the latter film to an electric potential applied to such latter electrode surfaces for determining electrical conductivity of the latter film by current flow through any solid particles contaminants that may be contained therein.

References Cited in the file of this patent

UNITED STATES PATENTS

| | | |
|---|---|---|
| 1,826,247 | Heppenstall | Oct. 6, 1931 |
| 1,913,436 | Eckstein | June 13, 1933 |
| 1,926,084 | Clark | Sept. 12, 1933 |
| 1,995,492 | Andrus et al. | Mar. 26, 1935 |
| 1,996,063 | Corkran | Apr. 2, 1935 |
| 2,349,992 | Schrader | May 30, 1944 |
| 2,442,518 | Stratton | June 1, 1948 |
| 2,624,782 | Lowson | Jan. 6, 1953 |